Nov. 3, 1970 — R. L. COOK — 3,537,732

FITTING FOR FLEXIBLE WALLED RECEPTACLE

Filed Jan. 27, 1969

INVENTOR
RICHARD L. COOK
BY
Willard S. Browne
ATTORNEY

United States Patent Office 3,537,732
Patented Nov. 3, 1970

3,537,732
FITTING FOR FLEXIBLE WALLED RECEPTACLE
Richard L. Cook, Rte. 2, Box 444, Flagstaff, Ariz. 86001
Filed Jan. 27, 1969, Ser. No. 802,311
Int. Cl. F16l 5/00
U.S. Cl. 285—200                6 Claims

ABSTRACT OF THE DISCLOSURE

A fitting for defining an opening in a flexible walled tank to which attachments such as connectors, gauges, pumps, conduits and the like are mounted, and is particularly directed to a nylon fiber bundle structure adhesive bonded to the tank reinforcement and acting as a structural intermediate between the fitting and the flexible fuel tank or other self-sealing or impact resistant bladder-type container.

BACKGROUND OF THE INVENTION (1) This invention pertains to a fitting for attachment to flexible wall containers, and is particularly directed to a fitting to provide an opening in an impact resistant flexible wall fuel tank for aircraft and the like.

(2) Heretofore, it has been difficult to make strong mechanical connections between rigid and elastic structures such as flexible wall containers or gasoline tanks particularly of the type used in military aircraft. Indeed, such strong fittings have generally not been necessary because of the relative weakness of the tanks themselves. However, with the development of truly impact resistant tanks a stronger fitting is also necessary to prevent fuel loss through weak fittings. Great difficulty has been experienced in having a metal flange or threaded fitting to which the various hoses, conduits, and control devices are to be fitted which would adhere to and be strongly bonded to the fabric of the tank structure. The fittings of this type formerly used did not satisfactorily transfer the loads from the tank to the fitting when subjected to high impact levels such as would be encountered in a crash. Rupture and leakage around the fitting relative to the flexible wall tank usually resulted. To surmount this difficulty a method of attachment was needed which would equal or nearly equal the strength of the tank itself.

SUMMARY OF THE INVENTION

One of the objects of this invention is to provide a fitting that is light in weight while at the same time is very strong in itself and may be so strongly and positively connected to the flexible wall of the receptacle to which it is connected that it will carry the full strength of the flexible wall into the fitting.

Another object of this invention is to provide a fitting in the form of a rigid metallic ring which is firmly anchored into the wall of the flexible wall container by the use of a series of specially arranged nylon fiber bundles or material of similar nature of tensile modulus and strength equal to the fuel cell or flexible tank reinforcement material.

A still further object of this invention is to provide a rigid fitting connected by the aforementioned fiber bundles into the wall structure of a flexible fuel tank which lends itself to the use of single or multiple plane construction or flanges of any conceivable required shape.

Still another object of this invention is to provide a fitting of rigid material which may be connected by a series of fiber bundles passing through specially prepared holes in the periphery of the fitting to positively secure the fitting into the wall of a flexible wall container.

Another object of this invention is to prevent peeling or progressive failure of the attachment of a rigid metallic ring to an elastic fuel tank structure by looping the elastic cords through the rigid fitting while utilizing cords with a modulus of elasticity equal to or nearly equal that of the tank reinforcement material.

DESCRIPTION OF THE PREFERRED EMBODIMENT

As an example of one embodiment of this invention, there is shown a fitting indicated generally at 10 for mounting in the flexible wall 11 of a flexible fuel tank 12. The fitting has a main mounting portion 13 to which various hoses, gauges, pumps, cover and access plates and the like may be attached in any usual manner.

Figure 1:
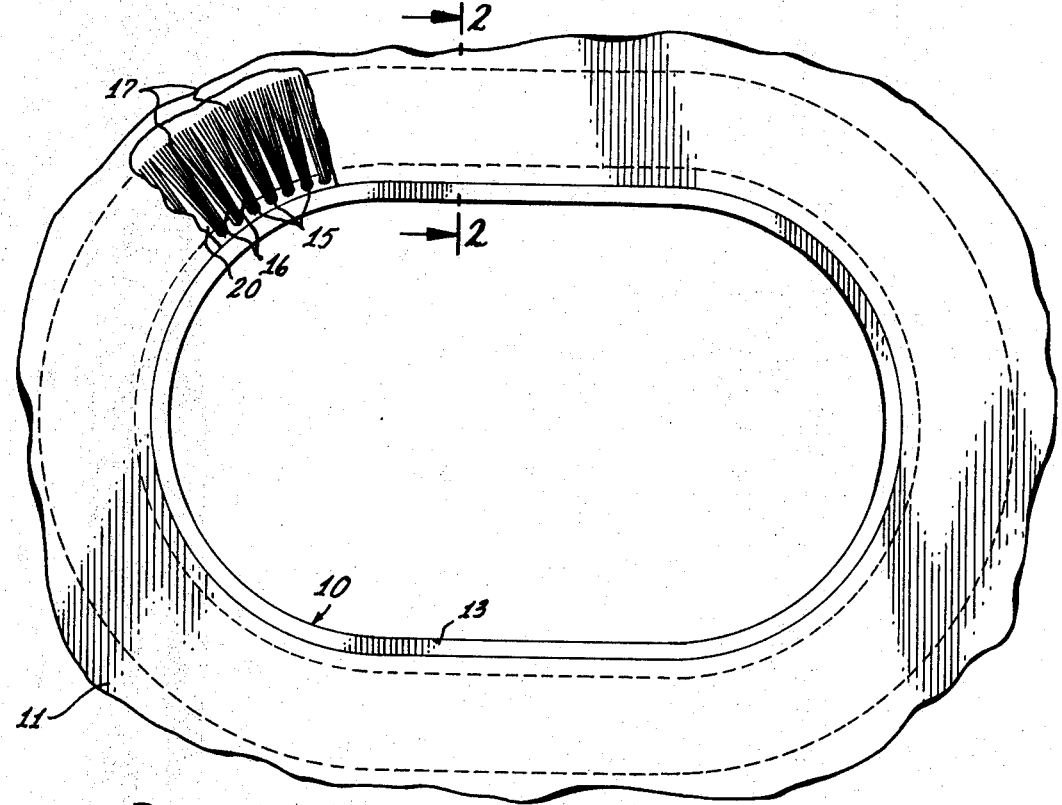
FIG. 1 is an outside view of a fitting for mounting in the flexible side of a fuel tank incorporating the features of this invention.
Figure 2:
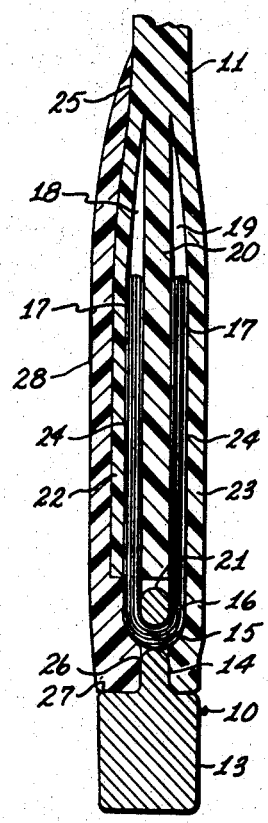
FIG. 2 is an enlarged fragmentary sectional view on the line 2—2 of FIG. 1.
Figure 3:
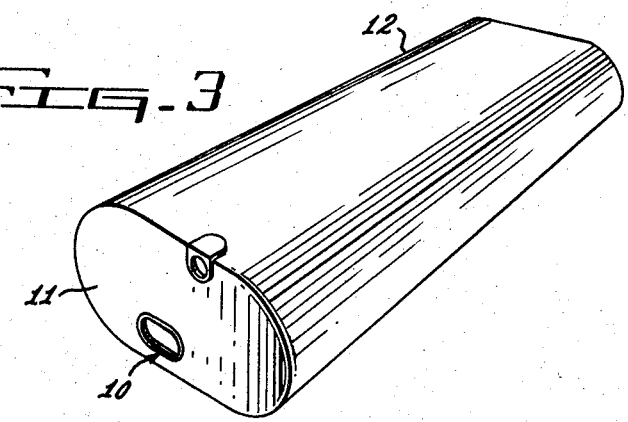
FIG. 3 is a general perspective view of a fuel tank showing an oval and a two place fitting of this invention applied thereto.

Formed integral with the main mounting portion 13 is a periphery or flange 14 in which are formed anchoring means in the form of a series of relatively small closely spaced axially disposed fiber bundle openings or holes 15 extending between the opposite faces of the flange 14. A series of deep U-shaped fiber bundles 16 are passed through the adjacent holes 15, folded back in U-shaped configuration, as illustrated in FIG. 2, and spread out laterally in fan-like fashion. The ends of the fiber extremities are substantially uniformly spaced apart about the flange 14 to form a continuous peripheral mat in the area 17 as shown in FIG. 1. The mat takes the form of spaced apart layers or peripheral areas 17—17.

The wall reinforcement laminations or plies 11 of the tank 12 are separated at 18 and 19 providing an intermediate section 20 complementally fitting between the peripheral areas 17—17 and extending to near the inside of the flange 14, while the outer sections 22 and 23 are presented over the outer faces 24 of the peripheral area of the bundles 16, this whole structure being imbedded in and bonded together by an appropriate elastic plastic adhesive. The free extremities of the fibers present a multiplicity of separate attachment points for such bonding. A sealing sheet 28 of suitable elastomeric material is placed over the inside wall surface 25 and the inside surfaces 26 and 27 of the fitting to form a fluid tight seal between the fitting 10 and flexible wall 11 of the tank with the imbedded fiber bundles, giving outstanding tensile strength and a lap bond capable of preventing peel or separation of the fitting from the wall of the tank.

What is claimed is:
1. A fitting for a flexible walled receptacle comprising in combination:
   a flexible walled receptacle;
   a fitting;
   a main mounting portion on said fitting;
   a peripheral flange formed on said fitting having a series of fiber bundle holes spaced about the peripheral flange;
   a series of deep U-shaped fiber bundles threaded in the fiber bundle holes;
   the flexible wall of the receptacle having an opening therein receiving said fitting, said opening being defined by portions of said flexible wall, said portions including an intermediate edge portion presented between and within the U-shaped fiber bundles and outer sections over the outside of the U-shaped fiber bundles;

and elastic plastic adhesive material permeating the contact areas between the fiber bundles and the recited flexible wall surfaces of the receptacle to bond the fitting thereto.

2. A fitting for a flexible walled receptacle as in claim 1 wherein the bundles are arranged at the outer ends of their U-shape to form a continual peripheral area of fibers bonded with the wall surfaces of the receptacle.

3. A fitting for a flexible wall, said fitting comprising:
a mounting portion including a periphery having anchoring means for securing a plurality of fiber bundles in adjacent relation about said periphery;
and a plurality of fiber bundles secured upon said periphery by said anchoring means, the fibers of said bundles extending outwardly of said periphery in spread-apart, fan-like fashion whereby the free extremities of said fibers present a multiplicity of separate attachment points for bonding to complementary portions of said flexible wall.

4. A fitting according to claim 3 wherein the ends of said extremities of said fibers are substantially uniformly spaced apart about said periphery.

5. A fitting according to claim 3 wherein said anchoring means include a plurality of spaced apart openings extending between opposite faces of said periphery, and wherein said fiber bundles are disposed through said openings, respectively, the fiber extremities adjacent one of said faces extending outwardly of said periphery in a first layer, and the fiber extremities adjacent the other of said faces extending outwardly of said periphery in a second layer spaced from said first layer, whereby complementary portions of said flexible wall can be received between said first and second layers to facilitate bonding thereof to said fiber bundles.

6. A joint between a rigid mounting and a laminated flexible wall, said joint comprising:
a substantially rigid mounting including a periphery having anchoring means for securing a plurality of fiber bundles in adjacent relation about said periphery;
a plurality of fiber bundles secured upon said periphery by said anchoring means, certain extremities of said fibers extending outwardly of said periphery in spread-apart, fan-like fashion in a first layer, and certain other extremities of said fibers extending outwardly of said periphery in spread-apart, fan-like fashion in a second layer spaced from said first layer;
separate laminations on said flexible wall extending over, between, and under said first and second layers;
and elastic adhesive material permeating the said fiber extremities and bonding said fiber extremities to said laminations.

References Cited

UNITED STATES PATENTS

| | | | |
|---|---|---|---|
| 2,366,442 | 1/1945 | Cunningham | 285—200 |
| 2,441,009 | 5/1948 | Cunningham | 285—200 |
| 2,772,101 | 11/1956 | Smith | 285—200 |
| 2,911,236 | 11/1959 | Thiboult | 285—149 |

DAVE W. AROLA, Primary Examiner

U.S. Cl. X.R.

285—238